HENRY CARPENTER.
Improvement in Fruit Baskets.
No. 120,620.                               Patented Nov. 7, 1871.
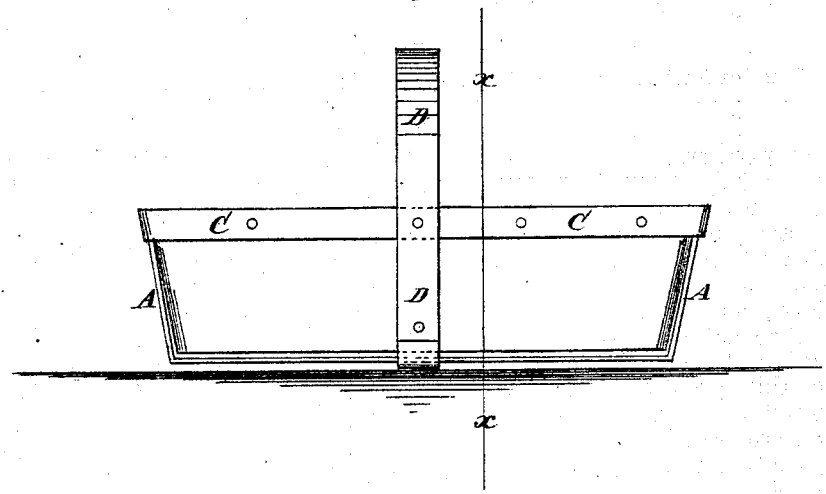
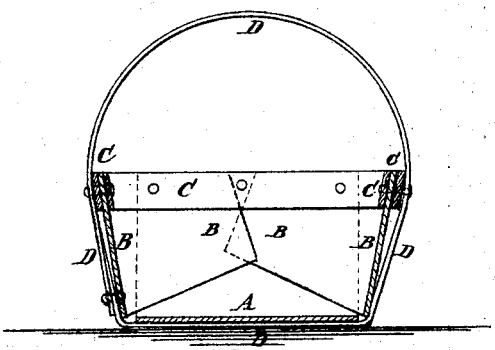

*Reissued July 16th 1872.*

120,620

UNITED STATES PATENT OFFICE.

HENRY CARPENTER, OF WILLIAMSBURG, NEW YORK.

IMPROVEMENT IN FRUIT-BASKETS.

Specification forming part of Letters Patent No. 120,620, dated November 7, 1871.

*To all whom it may concern:*

Be it known that I, HENRY CARPENTER, of Williamsburg, in the county of Kings and State of New York, have invented certain Improvements in Fruit-Baskets; and I do hereby declare that the following is a full, clear, and exact description thereof, which will enable others skilled in the art to make and use the same, reference being had to the accompanying drawing forming part of this specification, in which—

Figure 1 is a side view of my improved basket. Fig. 2 is a detail cross-section of the same taken through the line $x\ x$, Fig. 1.

Similar letters of reference indicate corresponding parts.

My invention has for its object to furnish an improved fruit-basket for sending fruit to market, for use upon stands, to enable the purchaser to carry away his fruit conveniently and safely, and which may be used for various other purposes; and it consists in the basket constructed as hereinafter more fully described.

A is the bottom strip of the basket, which is made of the desired width of said basket. The end parts of the strips A are bent upward to form the ends of the basket. B are the strips that form the sides of the basket. The strips B are made as wide as the desired height of the basket, and their end parts are bent inward to overlap the turned-up end parts of the strip A. The upper edge of the basket is strengthened, and the bent end part of the strips A B secured in place by two bands, C, placed the one upon the outer and the other upon the inner sides of said edge. The bands C are secured to each other and to the said edge by tacks. D is the handle, which is passed entirely around the sides and the bottom of the basket, and its ends are overlapped and secured to each other and the basket, as shown in Figs. 1 and 2, so as not only to serve as a handle, but also to serve as a band to support the middle parts of the strips A B, and thus strengthen the basket.

In the case of long baskets, bands may be passed around it from edge to edge to strengthen the strips A B, in the same manner as the lower parts of the handle D strengthen them. In the case of small baskets this is not necessary.

Having thus described my invention, I claim as new and desire to secure by Letters Patent—

An improved fruit-basket formed of the three strips A B B, strengthened at its upper edge by the band C, and in its middle part by the strip or handle D extended around the sides and bottom of said basket, and whether any additional bands be used or not, substantially as herein shown and described, and for the purpose set forth.

HENRY CARPENTER.

Witnesses:
JAMES T. GRAHAM,
T. B. MOSHER. (63)